though it is highly toxic ($LD_{50}$, 15 mg./kg.) to mammals. However, the high toxicity would appear likely to deter its use in dwelling areas, around livestock and on foodstuffs.

3,083,137
3,5-DIISOPROPYLPHENYL N-METHYLCARBAMATE, A LOW TOXICITY INSECTICIDE

Edward D. Weil, Lewiston, N.Y., assignor to Hooker Chemical Corporation, Niagara Falls, N.Y., a corporation of New York
No Drawing. Filed Apr. 13, 1961, Ser. No. 102,647
2 Claims. (Cl. 167—30)

This invention relates to a novel potent insecticide of aromatic origin.

More particularly, this invention describes a novel insecticidal composition of matter, 3,5-diisopropylphenyl N-methylcarbamate, highly toxic to insects including various species of flies, mosquitoes, beetles and moths, yet having low mammalian toxicity.

It has been known for some time that insects are among the important carriers or vectors of infection and disease. This problem is particularly acute in the tropics and sub-tropics where sanitation and hygienic procedures and facilities are often primitive or non-existent. The common housefly (*Musca domestica*), and some of its relatives transmit typhoid, anthrax, dysentery, cholera, yaws and some forms of conjunctivitis amongst other infectious diseases. The mosquito of course is a known vector of several widespread and important diseases including malaria and filariasis which debilitate the population of a large part of the tropics and sub-tropics. Other major diseases transmitted by flies or mosquitoes include dengue fever, trypanosomiasis, encephalitis and yellow fever. Because of the economic and public health problems there has always been an attempt to develop insecticides which can control or hopefully eradicate these insect vectors. With the advent of DDT and related chlorinated insecticides, which were the first truly effective synthetic insecticides, the control of these insect vectors seemed assured. Indeed, DDT and its analogs had the four characteristics that are essential for a good commercial insecticide: high insecticidal activity, good persistence, low cost, and most important, surprisingly low mammalian toxicity (DDT has a $LD_{50}$, 250 mg./kg.), which allowed their widespread use in dairy farms, on crops and livestock and in food processing plants generally. The importance of low mammalian toxicity in an insecticide is difficult to over-emphasize since the presence and amount of mammalian-toxic materials in foods, besides being obviously undesirable, are regulated by statute in many states. Unfortunately, the initial toxic effect of these insecticides has diminished apparently due to the ability of successive generations of the insects to detoxify the chlorinated insecticides. Whatever the reasons are, the build-up of insect resistance to these chlorinated insecticides has once again caused a widespread campaign to find and develop new insecticides possessing the favorable characteristics that the chlorinated insecticides had, that is low mammalian toxicity, good residual toxicity to insects (persistence), and high insecticidal activity. Unfortunately, while many new classes of insecticides have been developed, all have had serious shortcomings of one kind or another that have prevented their widespread acceptance. For instance, the various organo-phosphorus insecticides have had one or more disadvantages such as high mammalian toxicity or poor persistence, while the pyrethrins being a natural product, are of limited supply, fairly costly and their structure cannot be readily altered as can the synthetics. The carbamates initially appeared to be promising but generally have a high mammalian toxicity, some lack activity against flies and mosquitoes and are costly to prepare. Yet the need for effective insecticides is so urgent that in spite of these shortcomings, several carbamates have come to be used for various special purposes. For example, one carbamate derived from 1-naphthol, though ineffective against flies and mosquitoes is commercially used against crop insects. Another carbamate, referred to in the literature as AC 5727 (3-isopropylphenyl N-methylcarbamate), has been suggested for use against mosquitoes and certain other insects, even though it is highly toxic ($LD_{50}$, 15 mg./kg.) to mammals. However, the high toxicity would appear likely to deter its use in dwelling areas, around livestock and on foodstuffs.

Quite unexpectedly, the applicant has found a carbamate that has all of the desirable attributes of a good insecticide, that is, high activity, good persistence, low cost of manufacture and most important, low mammalian toxicity. This latter characteristic is most suprising since the applicant's compound is a close structural analogue of the known 3-isopropylphenyl N-methylcarbamate, differing from it only in the addition of a second isopropyl radical, yet it is $\frac{1}{35}$ as toxic to mammals as the monosubstituted analogue. In fact, this novel composition, 3,5-diisopropylphenyl N-methylcarbamate is less toxic than DDT, $LD_{50}$ of 560 mg./kg., as compared to 250 mg./kg. Thus, this insecticide may readily be used around dwellings, barns, food and food processing apparatus with relative safety.

While the surprisingly low mammalian toxicity of the compositions of this invention as compared to the prior art is a salient advantage of this invention, the composition does possess other valuable attributes.

For example, the insecticide has a very high level of contact and residual activity against the housefly and mosquito and against the economically significant Mexican bean beetle. In addition, amongst others, the following major insects appear to be susceptible to the insecticidal composition: bollweevils, boll worms, gypsy moths, leaf hoppers, leaf rollers, grasshoppers, thrips, Colorado potato beetles, elm beetles, and plum curculios. The insecticide is effective either by application to the foliage of the crops, to the soil, or in some cases, to the seeds. In controlling tree insects, it may be effective by application or implantation in the trunk.

An ancillary and related advantage of the inventive composition is its rapidity of action known as "rapid knockdown." By knockdown is meant that percentage of insects out of the total number treated with a given amount which are immobilized and not capable of walking or flying at a measured time interval after such treatment. Houseflies seem to be especially susceptible to the rapid knockdown effect after contact with the insecticide of this invention.

Yet another advantage of this insecticidal composition is it may be readily formulated in various ways. For example, it may be used as a reaction "crude" or as the crystalline product. It may be employed by mixing it with conventional pest control adjuvants, diluents or conditioning agents, hereinafter referred to as inert carriers, to provide compositions in the form of solutions, emulsions, dispersions, powders dispersible in water or other solvents, dusts or the like. For example, it may be formulated with a carrier or diluent substance such as finely divided solid, a solvent of organic or inorganic origin, water, a surface active agent or aqueous emulsion or any suitable combination of one or more of any of these. For household and barn use, formulations with aerosol propellants such as the Freons are convenient. Such formulations or compositions facilitate handling and application and frequently enhance insecticidal effectiveness.

The liquid compositions discussed generally above, whether solutions or dispersions of the active agents in a liquid solvent or a wettable powder, may contain conditioning agents such as wetting agents, dispersing agents, emulsifying agents, suspending agents and the like known generally as surface active agents. A suitable but not exhaustive listing of these surface active agents are set forth among other places in "Soap and Chemical Specialties," vol. 31, No. 7, pages 50–61; No. 8, pages 48–61; No. 9, pages 52–67 and No. 10, pages 38–67 (1955).

Since the exact amount of insecticide in a given mixture will depend upon the type of use, species of insect, mode of formulation, mode of application, prevailing atmospheric conditions and other variables, it is not possible to state this application rate, generally with any degree of preciseness. However, where the insecticide is made up to treat crops being attacked by an insect pest, the general application rate of active insecticide will range from 0.03–10 pounds per acre with the upper rates above this figure limited by economics. In application to dwelling places and barns, a deposit of at least one mg. per square foot of surface is preferred. It may be said in passing that a diluent, conditioning agent and/or adjuvant material will usually make up the bulk of the insecticidal compositions with the active ingredient ordinarily being present on a percent weight basis of under ten percent, but generally, above about 0.005 percent.

The insecticide of the invention is compatible with other insecticides and may be used in combination with any of the insecticides, for example, such as those listed by Kenaga in the Bulletin of the Entomological Society of America, vol. 6, No. 2, pp. 56–72 (1960), said insecticides acting to complement, supplement, synergise, or otherwise enhance the activity of the insecticide of the invention. Since an outstanding merit of the present invention is low toxicity, it is preferred to combine applicant's new compound with other insecticides and activators of low toxicity, for example, DDT, DDD, methoxychlor, isobornyl thiocyanoacetate, lauryl thiocyanate, lethanes (substituted alkyl thiocyanates), malathion, ronnel, pyrethrins, synthetic pyrethrin analogs, O,O-dimethyl 2,2-dichlorovinyl phosphate, phosdrin, lindane, toxaphene, and the like. Since the compound of this invention has relatively low miticidal activity, it is advantageous to combine it with a miticide such as 1,1-bis(p-chlorophenyl)-2,2,2 - trichloroethanol, p-chlorophenyl 2,4,5 - trichlorophenyl sulfone, aryl alkyl sulfites, ethion, dimethoate, phorate, demeton, phosphamidon, quinoxaline trithiocarbonates, zineb, sulfur and bis(pentachlorocyclopentadienyl). The compound of the invention, because of its fast action, is useful in combination with slow-acting ingestion insecticides such as the product of melting point one hundred and forty-eight degrees from hexachlorocyclopentadiene and chlorosulfonic acid as described in U.S. Patent 2,516,404 (1951).

The insecticide of the invention may also be synergised by insecticidal synergists such as the following examples:

Piperonyl butoxide
Sesoxane(2-(3,4-methylenedioxyphenoxy)-3,6,9 - trioxaundecane)
Sulfoxide (n-octyl sulfoxide of isosafrole)
n-Propyl isome
Sesamine oil extractives
Octachlorodipropyl ether Other synergists usable with the compound of the invention are those listed by Kenaga, loc. cit., pp. 55–56.

When combined with other active materials, it frequently is convenient to use inert solid carriers or diluents. Among the many that can be used are included clays, talcs, flours, starches, silica, mica, vermiculite, sawdust, alkaline metal carbonates, hydroxides and phosphates.

The insecticidal composition of this invention is a colorless material which has been crystallized as needles melting at eighty to eighty-one degrees centigrade, and having a slight, not unpleasant odor. The material is only very slightly soluble in water, slightly soluble in petroleum fractions and the cold aliphatic hydrocarbons, and more soluble in hot aliphatics, the lower alcohols, acetone and aromatic hydrocarbons.

The 3,5-diisopropylphenyl N-methylcarbamate may be prepared in good yield from low-cost starting materials, namely, benzene, propylene, air, phosgene and methylamine by the following reactions:

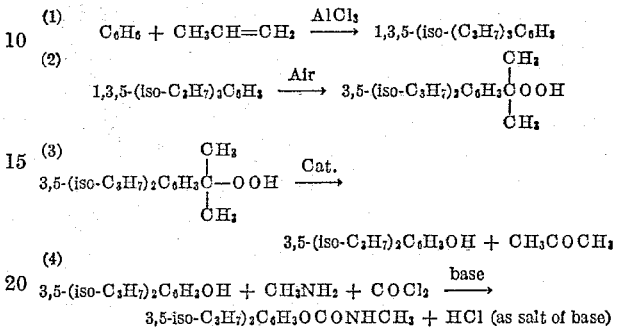

The first three steps are described by Shepard in U.S. Patent 2,790,010. The last step is generally done in two stages which may be alternatively as follows: the phenol, conveniently in the form of a salt, is reacted with phosgene to obtain 3,5-diisopropylphenyl chloroformate, which is then reacted with methylamine to form the carbamate; alternatively, the methylamine is reacted with phosgene to form either N-methylcarbamyl chloride ($CH_3NHCOCl$) or, at higher temperatures above about two hundred degrees, methyl isocyanate ($CH_3N=C=O$), either of which intermediates is then reacted with 3,5-diisopropylphenol, preferably in the presence of a base, to form the carbamate. The base used in the above steps is not critical; it may be caustic soda or sodium carbonate for example, or a tertiary amine. To further make clear the invention, the following non-limiting examples are given for purposes of illustration:

*Example 1.—Preparation of 3,5-Diisopropylphenyl N-Methylcarbamate*

To a solution of one hundred and seventy-eight parts of 3,5-diisopropylphenol (made by the method of U.S. Patent 2,790,010), and one hundred and ten parts of triethylamine plus eight hundred parts of benzene is added one hundred and ten parts of methylcarbamyl chloride, dissolved in eight hundred parts of benzene. The reaction mixture is stirred and slowly brought up to sixty-five degrees by external heating aided by the exothermic reaction. After one hour, it is cooled and the triethylamine hydrochloride filtered off. The benzene is then stripped off under reduced pressure and the residual solid recrystallized from heptane to obtain a ninety percent yield of colorless crystalline solid, melting point eighty-one degrees.

*Analysis.*—Calcd. for $C_{14}H_{21}O_2N$: C, 71.5 percent; H, 8.94 percent; N, 5.96 percent. Found: C, 71.3 percent; H, 8.9 percent; N, 5.8 percent.

*Example 2.—Formulation as Wettable Powder*

The following materials were blended:

| | Parts by weight |
|---|---|
| 3,5-diisopropylphenyl N-methylcarbamate | 25 |
| Microcel E (synthetic silicaceous carrier) | 65 |
| Sorbit P (aryl alkyl sulfonate wetting agent) | 5 |
| Marasperse N (lignosulfonate dispersing agent) | 5 |

The mixture was ground to pass three hundred and twenty-five mesh by use of a high-speed hammer mill, to obtain a powder dispersible in water.

*Example 3.—Formulation as Emulsifiable Concentrate*

The following ingredients were blended:

| | Pounds |
|---|---|
| 3,5-diisopropylphenyl N-methylcarbamate | 2 |
| Emcol H300X (commercial emulsifier) | 0.15 |
| Emcol H500X (commercial emulsifier) | 0.15 |
| Zylene:isophorone 3:1 mixture by vol. to make total 1 gallon. | |

A clear solution, emulsifiable in water, was obtained.

*Example 4.—Formulation as Aerosol*

The following ingredients were blended to prepare an aerosol mixture:

| | Parts by weight |
|---|---|
| 3,5-diisopropylphenyl N-methylcarbamate | 1.0 |
| Piperonyl butoxide (synergist) | 1.0 |
| Isobornyl thiocyanoacetate (knock-down enhancing component) | 2.0 |
| Petroleum distillate (carrier) | 40.0 |
| Freon (carrier) | 56.0 |

*Example 5.—Mammalian Toxicity*

Using the conventional test animal, the rat, the acute oral $LD_{50}$ of the following three insecticides is determined.

| Chemical: | $LD_{50}$ (rat oral) |
|---|---|
| 3,5-diisopropylphenyl N-methylcarbamate | 350 |
| 3-isopropylphenyl N-methylcarbamate (AC5727) | 15 |
| DDT | 300 |

*Example 6.—Insecticidal Testing of the Composition of This Invention and Related Structures on Houseflies*

Fifty adult houseflies of the Chemical Manufacturers Association strain are sprayed with aqueous dispersions of the test chemical at various concentrations in a two by five inch diameter stainless steel cage faced on top and bottom with fourteen mesh screen. The flies are retained in the cage in which they are sprayed for knockdown observations and twenty-four hour mortality determinations. At concentrations down to 0.005 percent by weight, substantially one hundred percent knockdown is obtained in two hours and one hundred percent kill in twenty-four hours.

*Example 7.—Insecticide Tests on Mexican Bean Beetles*

Lima bean leaves are sprayed on the dorsal and ventral surfaces with aqueous dispersions of the test chemical at various concentrations. Ten larvae (late second instar) of the Mexican bean beetle are placed on the leaves. In twenty-four hours, one hundred percent mortality was observed at concentrations as low as 0.005 percent by weight.

*Example 8.—Mosquito Test*

An acetone solution of the compound of the invention is sprayed on a flat wooden surface so as to deposit 1.0, ten and one hundred mg./sq. foot of compound. Adult DDT-resistant mosquitoes are exposed for twenty minutes to the treated surface by confinement under inverted petri dishes. Then the mosquitoes are placed in insecticide-free holding cages and mortality observed twenty-four hours later. Essentially one hundred percent mortality is observed even at the lowest rate (one mg./sq. foot). The treated surfaces remain insecticidal for at least twenty weeks.

I claim:

1. 3,5-diisopropylphenyl N-methylcarbamate.
2. A method for the destruction and prevention of insects which comprises applying to the habitat of the insect an insecticidal amount of 3,5-diisopropylphenyl N-methylcarbamate.

References Cited in the file of this patent

UNITED STATES PATENTS

| 2,790,010 | Shepard | Apr. 23, 1957 |
| 2,854,374 | Huisman et al. | Sept. 30 1958 |
| 2,960,430 | Jones et al. | Nov. 15, 1960 |

FOREIGN PATENTS

| 852,920 | Great Britain | Nov. 2, 1960 |

OTHER REFERENCES

Kolbezen et al.: Agr. and Food Chem., vol. 2, No. 17 (1954), pp. 864–870.